United States Patent
Patel et al.

(10) Patent No.: US 8,978,383 B2
(45) Date of Patent: Mar. 17, 2015

(54) FUEL MANIFOLD HEAT SHIELD FOR A GAS TURBINE ENGINE

(75) Inventors: Bhawan B. Patel, Mississauga (CA); Oleg Morenko, Oakville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 533 days.

(21) Appl. No.: 13/429,789

(22) Filed: Mar. 26, 2012

(65) Prior Publication Data

US 2013/0247574 A1    Sep. 26, 2013

(51) Int. Cl.
F02C 7/22 (2006.01)
F23K 5/06 (2006.01)
F23K 5/14 (2006.01)
F23R 3/28 (2006.01)

(52) U.S. Cl.
CPC . *F23K 5/06* (2013.01); *F02C 7/222* (2013.01); *F05D 2260/231* (2013.01); *F23K 5/14* (2013.01); *F23R 3/28* (2013.01)
USPC .................. 60/739; 60/734; 60/740; 60/800

(58) Field of Classification Search
USPC .................................. 60/734, 739, 740, 800
See application file for complete search history.

(56) References Cited

U.S. PATENT DOCUMENTS

| 5,231,833 A | 8/1993 | MacLean et al. |
| 5,771,696 A | 6/1998 | Hansel et al. |
| 5,966,937 A * | 10/1999 | Graves ............................ 60/748 |
| 7,028,484 B2 * | 4/2006 | Prociw et al. ................... 60/772 |
| 7,654,088 B2 | 2/2010 | Shafique et al. |
| 7,765,808 B2 | 8/2010 | Fish et al. |
| 7,926,286 B2 | 4/2011 | Morenko et al. |
| 7,942,002 B2 | 5/2011 | Fish et al. |
| 2008/0078080 A1 * | 4/2008 | Patel et al. .................... 29/889.2 |
| 2008/0083225 A1 * | 4/2008 | Fish et al. ........................ 60/772 |
| 2010/0146928 A1 * | 6/2010 | Morenko et al. ........... 60/39.094 |
| 2010/0281881 A1 | 11/2010 | Morenko |

* cited by examiner

*Primary Examiner* — Phutthiwat Wongwian
*Assistant Examiner* — Steven Sutherland
(74) *Attorney, Agent, or Firm* — Norton Rose Fulbright Canada LLP

(57) ABSTRACT

A fuel manifold assembly for a gas turbine engine is described and includes an annular manifold body and an annular heat shield assembly mounted to and surrounding the manifold body. The heat shield assembly has an inner surface facing the manifold body and spaced apart therefrom by an inner air gap, which substantially surrounds the manifold body, defined therebetween. The heat shield assembly has an outer surface facing away from the manifold body and spaced apart from the inner surface by an outer air gap substantially surrounding the inner air gap. At least the outer air gap is formed by a double wall configuration of the heat shield assembly.

19 Claims, 5 Drawing Sheets

FUEL MANIFOLD HEAT SHIELD FOR A GAS TURBINE ENGINE

TECHNICAL FIELD

The application relates generally to fuel injection systems for gas turbine engines and, more particularly, to a heat shield assembly for a gas turbine engine fuel manifold.

BACKGROUND

Internal fuel manifolds are typically installed within the combustor chamber outer casing (or gas generator casing) cavity with fuel nozzles thereof leading into the combustor chamber. Although they are not in the combustor chamber itself, they can be exposed to relatively high temperatures, especially in the case of gas turbine engines having a high pressure ratio.

If the temperature of the internal wetted surface of the fuel manifold in contact with the liquid fuel exceeds a given threshold, the fuel in contact with the wetted surface can form varnish which, with time, can convert to coke and reduce the fuel flow area. Eventually, performance of the fuel nozzles and durability of the hot section can be affected.

Accordingly, there remains room for improvement in addressing temperature control of the fuel manifold fuel conduits.

SUMMARY

There is provided a fuel manifold assembly for a gas turbine engine comprising: an annular manifold body defined around an axis, with at least one fuel inlet, a plurality of fuel nozzle outlets, and at least one internal fuel passages connecting the at least one inlet to the plurality of fuel nozzle outlets; an annular heat shield assembly mounted to and surrounding the manifold body, the heat shield assembly having an inner surface facing the manifold body and being spaced apart therefrom by an inner air gap defined therebetween, the inner air gap substantially surrounding the manifold body, and the heat shield assembly having an outer surface facing away from the manifold body and spaced apart from the inner surface by an outer air gap substantially surrounding the inner air gap, the outer air gap being formed by a double wall configuration of the heat shield assembly.

There is also provided a heat shield assembly for a gas turbine engine fuel manifold having an annular body around an axis, with at least one fuel conduit formed therein and extending along an arc-shaped path in the annular body between a fuel inlet and at least one fuel outlet, the heat shield assembly comprising: a front shield member having a recess shaped to axially receive at least a portion of the annular body of the fuel manifold therein, a double wall portion with a dead air gap therein, and two free edges forming an opening to the recess; a rear shield member having a recess shaped to axially receive at least a portion of the annular body of the fuel manifold therein, a double wall portion with a dead air gap therein, and two free edges forming an opening to the recess, the rear shield member being snugly engageable with the front shield member for the recesses to unite with the annular body therein and an inner air gap being formed between the annular body and an internal face of the engaged shield members and an outer air gap including the dead air gaps being formed between the internal face of the engaged shield members and an external face of the engaged shield members; wherein the combined inner air gap and outer air gap form a thermal insulation system for the fuel conduit.

Further details of these and other aspects of the present invention will be apparent from the detailed description and figures included below.

DESCRIPTION OF THE DRAWINGS

Reference is now made to the accompanying figures, in which.

DETAILED DESCRIPTION

Figure 1:
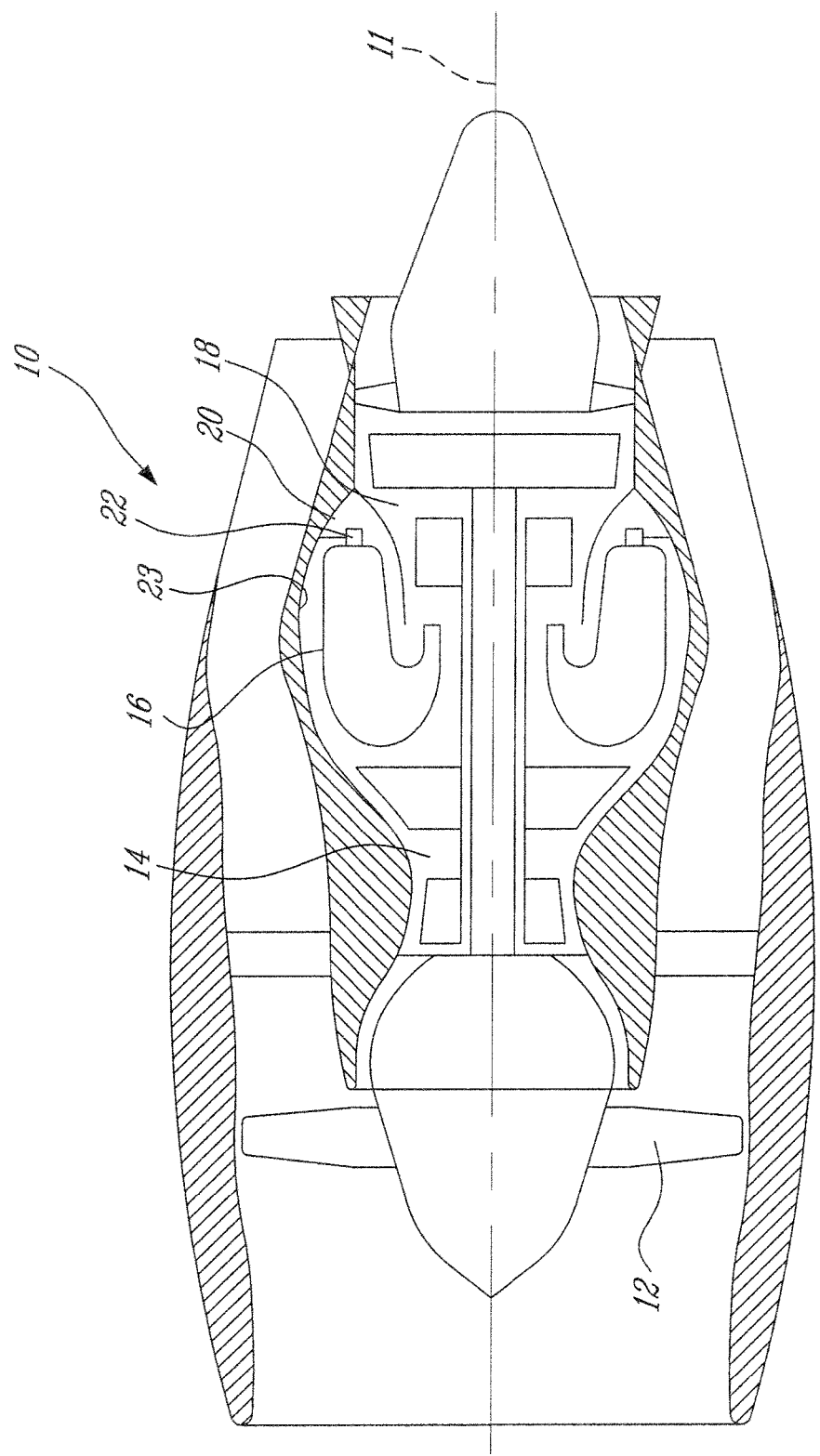
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Fuel is injected into the combustor 16 of the gas turbine engine 10 by a fuel injection system 20 which is connected in fluid flow communication with a fuel source (not shown). The fuel injection system 20 includes an internal fuel manifold ring 22 which is mounted in conjunction with the combustor 16 within a combustor chamber outer casing (or gas generator casing) 23 of the gas turbine engine 10. The fuel injection system 20 is operable to inject fuel into the combustor 16 for mixing with the compressed air from the compressor 14 and ignition of the resultant mixture. The fan 12, compressor 14, combustor 16, and turbine 18 are preferably all concentric about a common central longitudinal axis 11 of the gas turbine engine 10.

Figure 2:
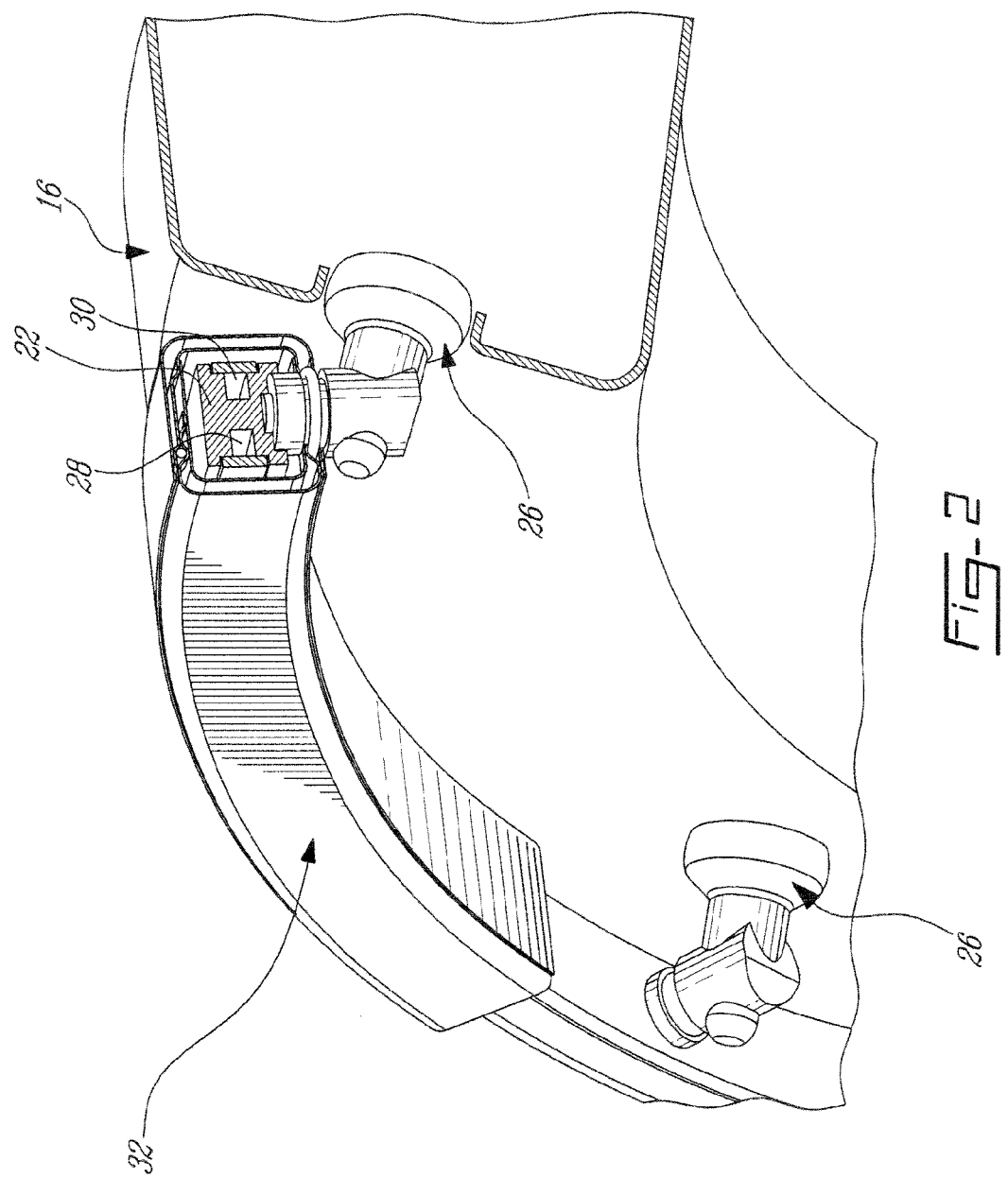
FIG. 2 is a schematic partially sectioned perspective view of a fuel manifold assembly having a heat shield.

FIG. 2 shows a fragmented portion of the annular body of the internal fuel manifold ring 22. When it is mounted in conjunction with the combustion chamber 16, the fuel manifold ring 22 is defined around an axis which coincides with the common central longitudinal axis 11 of the gas turbine engine 10 (FIG. 1). Typically, the fuel manifold ring 22 can extend circumferentially around the entire engine and has at least one fuel inlet (not shown) connected to a plurality of fuel nozzles 26 via at least one internal fuel path.

In the depicted embodiment, the fuel manifold ring 22 more particularly has two independent internal fuel conduits or passages 28, 30 which can correspond, for instance, to a primary fuel path used when starting the engine and to a secondary fuel path used to bring the engine to full power. The fuel circulates through these circumferentially extending fuel conduits/passages 28, 30 within the annular body of the fuel manifold, and therefore the passages 28, 30 may have the shape of an arc or annulus.

A heat shield assembly 32 (only a fragmented section of which is shown in FIG. 2) surrounds the fuel manifold ring 22.

Figure 3:
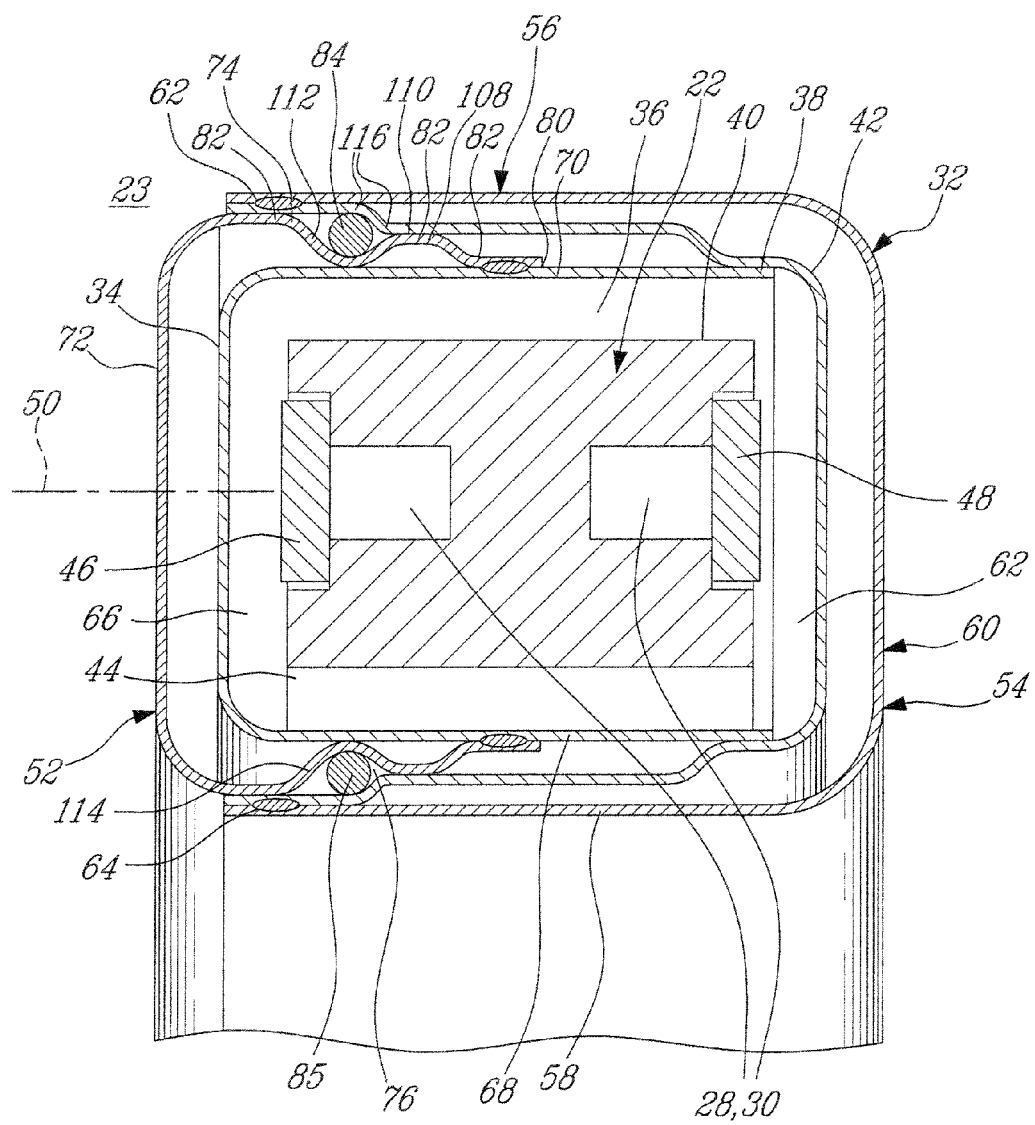
FIG. 3 is a schematic cross-sectional view taken through the fuel manifold assembly of FIG. 2 at a first location.

Referring to FIG. 3, during use, fuel at relatively low temperatures (e.g. <300° F.) circulates inside the internal fuel passages 28, 30 of the fuel manifold ring 22 as it flows between the inlet(s) and the nozzles 26. This low temperature fuel flow tends to cool the fuel manifold ring 22 by absorbing heat therefrom, thereby increasing the temperature of the fuel. The outer surface 34 of the heat shield assembly 32 can be subjected to high temperatures (e.g. >900° F.) due to high-temperature gas flowing at relatively high velocities, such as due to swirl being imparted by the compressor. The high velocity gas imparts a significant amount of convection heat transfer to the outer surface 34 of the heat shield assembly 32, which can be close in temperature to the temperature of the high velocity gas in the combustor outer casing 23.

As will be detailed below, an internal air gap or spacing 36 which extends substantially around the full cross-sectional periphery of the fuel manifold 22, is provided between the internal surface 38 of the heat shield assembly 32 and the outer surface 40 of the fuel manifold ring 22. One purpose of this internal air gap 36 is to impede direct conduction heat transfer between the heat shield assembly 32 and the fuel manifold ring 22 and to provide thermal insulation. Further, the heat shield assembly 32 is designed with another, outer air gap 42 between a double walled construction thereof, which provides further thermal insulation. The resulting double air gap insulation system restricts the amount of heat transferred between the high velocity hot gas surrounding the heat shield 32 and the body of the fuel manifold 22, and can favour the attainment of an equilibrium during use where the temperature of the wetted walls of the internal fuel passages 28, 30 preferably remain below a given threshold temperature, which can be of 400° F. for instance, to reduce the likelihood of varnish formation and coke build-up. As will be detailed below, however, with the help of seals (such as wire rope seals for example) pressure regulation between the internal cavities 36 and 80 and the combustor chamber outer casing 23 can be provided for in order to prevent collapsing of the heat shield assembly 32, particularly when pressure changes occur such as during engine transient. Pressure in the cavity 42 may be regulated through small holes in the inner wall of the heat shields 66 and 110.

Therefore, during use, the heat input to the manifold ring 22 by the high velocity air in the outer combustion chamber casing 23 is reduced by the two air blankets (36, 42) which shield against heat. Thus, during engine running conditions, the fuel can help to maintain the wetted wall temperature lower than the threshold temperature by balancing the radiation heat load from the heat shield and conduction heat load from contacts at interfaces such as fuel nozzles and inlets.

FIG. 3 shows a cross sectional view of the heat shield assembly 32 and fuel manifold body 22 at an area without such interfaces. The fuel manifold body 22 is shown schematically for illustrative purposes only. The fuel manifold body 22 in this embodiment has two internal fuel passages 28, 30, or fuel cavities, formed in ring member 44. The fuel cavities 28, 30 are closed off by cover plates 46, 48 which are brazed in place on the ring member 44 in this embodiment. The fuel manifold body 22 can thus be said to have an outer or peripheral surface 40 which can optionally be reflective, such as by being coated by a reflective material such as chromium, platinum alloy or similar, for instance, to reflect radiation heat back to the heat shield 32.

The heat shield assembly 32 includes two separate shield members which are designed engage with one another by an opposing movement in the axial direction (i.e. parallel to axial axis 50), such that they together surround and shield the fuel manifold body 22. To this end, the heat shield assembly 32 includes a first shield member 52 and a second shield member 54, one of which can be a front shield member and the other a rear shield member relative to the engine orientation (see FIG. 1). In this embodiment, both the first shield member 52 and the second shield member 54 generally have a U-shaped configuration with flanges 56, 58 extending normal from a double walled web portion 60 having a dead-air gap 62 therein, and a recess being formed between the flanges and the web portion 60. The flanges 56, 58 have free edges 62, 64 which form an opening to the recess and which are designed to snugly abut against a corresponding outer face or inner face of the other shield member into an engagement therewith. More particularly, in this embodiment, the second shield member 62 has flanges 56, 58 more broadly spaced apart from one another than those of the first shield member 52, to receive the flanges of the first shield member 52 therebetween into the snug abutment engagement.

In this embodiment, both shield members 52, 54 are made of a combination of two sheet components which together form the corresponding double walled web portion. In the first shield member 52, an inner sheet component 66 has flanges 68, 70 which extend straight to free edges, whereas an outer sheet component 72 has flanges 74, 76 which begin parallel to the flanges 68, 70 of the inner sheet component 66, but which are then folded or bent to come into contact with the straight flanges 68, 70 of the inner sheet component 66. Oppositely, to provide for the engagement, the second shield member 54 has an outer sheet component with straight-extending flanges, and an inner sheet component with flanges which begin parallel to the flanges of the outer sheet component, but which then fold outwardly to come into contact with the flanges of the outer sheet components. This configuration ensure that with the free edges 62 of one shield member coming into abutment contact with the flanges 74, 76 of the other, a dead air spacing 80 is created between the two shield members 52, 54, in the overlapping region thereof, which form, with the dead air spacings 62 between the double walls of the web portions 60, the outer spacing 42 allowing for a quasi-continuous air blanket surrounding the inner spacing 36. The sheet components can have coinciding ends, such as those shown in the second shield member 54 illustrated, or non-coinciding ends, such as those shown in the first shield member 52, depending on design considerations. In this particular embodiment, the sheet components 72 which have folded flanges are formed with double folded steps 82 and an area for a seal 84 between the sheet members is provided. These latter features also are optional and will be detailed further below.

Figure 4:
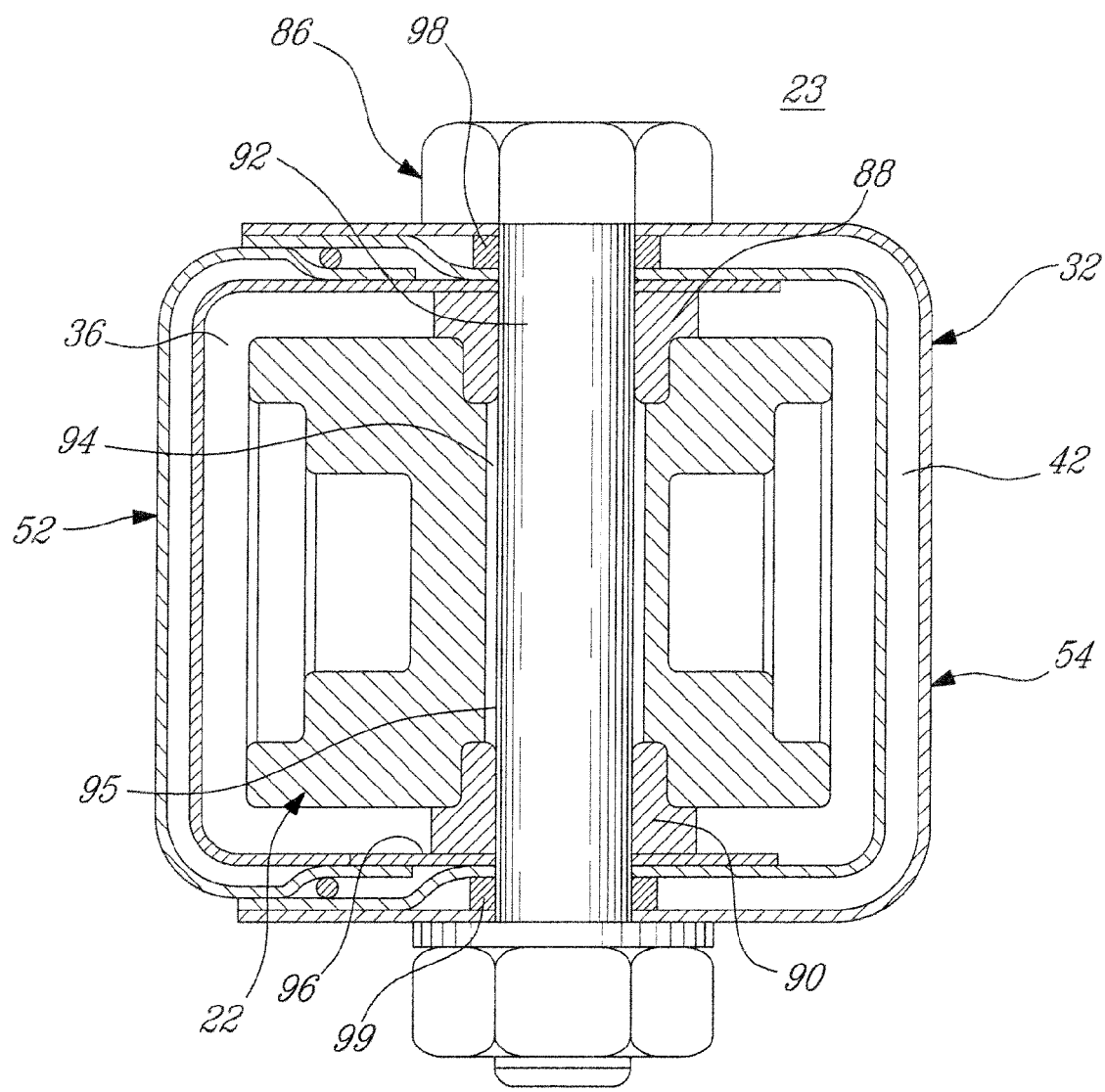
FIG. 4 is a schematic cross-sectional view taken through the fuel manifold assembly of FIG. 2 at a second location.

Turning now to FIG. 4, in this illustrated embodiment, the heat shield 32 is fastened in place about the fuel manifold ring 22 using a number of circumferentially interspaced, and radially extending, fasteners which mate within corresponding bushings. Although other configurations remain possible to secure the hat shield 32 in place about the fuel manifold ring 22, the embodiment of FIG. 4 which employs threaded fasteners 86 will now be described in further detail. In this embodiment, the fastener can be a bolt 86, and the bushings can be provided both for reasons of thermal insulation and stress control. In fact, the presence of these arrangements is a potential path for conduction heat transfer, or so-called "heat bridges", which can form between the heat shield 32 and the fuel manifold ring 22. In this embodiment, this potential effect is impeded as will be detailed. The bolt 86 is typically made of metal and is thus heat-conductive, and it is in contact with the hot air in the outer combustion chamber casing 23. For a secure assembly, a contact must be established between the bolt 86 and the fuel manifold ring 22 inside. In this embodiment, this contact is not made directly, but rather via bushings 88, 90. Therefore, the fuel manifold ring 22 has a bore 95 defined therein which is larger than the shank 92 of the bolt 86 to leave an insulating dead air space 94 therebetween. Bushings 88, 90 are inserted in the opposite ends of the bore 95 and are firmly trapped therein. The shank 92 is snugly and firmly (i.e. in tight fit engagement) received by the inner bushings 88, 90 to avoid an amount of play which would lead to contact between the shank 92 and the body of the fuel manifold ring 22. The inner bushings 88, 90 can also exceed from the bore 95 and come into contact with the inner surface 96 of the heat shield 32 to bridge the inner air gap 36 and provide for an insulating seat for the heat shield 32. Outer bushings 98, 99 can be used in the outer spacing 42. If the outer bushings 98, 99 are positioned inside the double-wall dead-air gap as shown, they can be secured in place by a braze or weld, for instance. In this configuration, the bolt 86 can be tightened and the bushings 98, 88, 90, 99 can control axial stress in the heat shield 32 which could otherwise occur from the bolt tightening by opposing a reaction force preventing the heat shield 32 from collapsing. The bushings 98, 88, 90, 99 can be made of a material which is heat resistant, but which has a relatively low thermal conductivity—sintered nickel alloys or carbon composites can be useful to this end, for instance. In an alternate embodiment, the heat shield 32 can be fastened to the fuel manifold ring 22 directly with a fastener of sintered alloy or carbon composite, for instance, potentially avoiding the use of bushings. In another alternate embodiment, the heat shield can be fastened to the fuel manifold ring by way of the fuel nozzles and/or fuel inlet(s), for instance.

The sheet components forming the shield members 52, 54 can be made of metal for instance, in which case they can be formed by pressing. IN625 sheet metal sheets having a thickness between 0.015 to 0.023 inches were used in the illustrated embodiment, for example. The two sheet components of each shield member can be secured together, such as by welding or brazing for instance, or can be left unwelded but assembled by way of the bolts or other fasteners, for instance.

Figure 5:
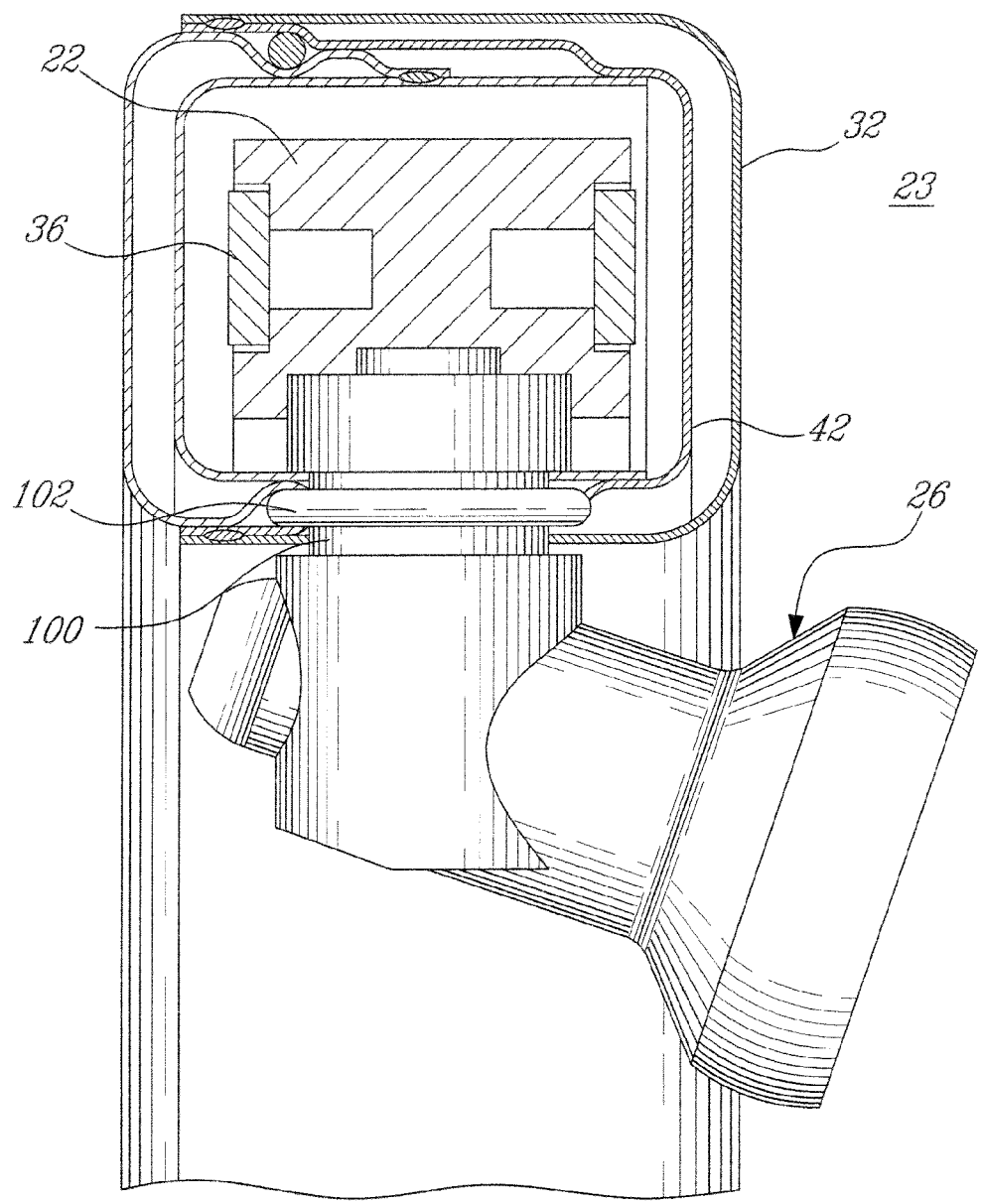
FIG. 5 is a schematic detailed side view taken from the cross-sectional view of FIG. 2.

Turning to FIG. 5, the manner in which the fuel nozzles 26 is connected to the fuel manifold ring 22, through the heat shield 32, in this particular embodiment is shown. This connection is designed in a manner where the heat shield members 52, 54 are assembled after having mounted the fuel nozzles 26 to the fuel manifold ring 22. In this case, the heat shield members 52, 54 have cuts or openings therein, having a U-shape for example, accommodating a neck portion 100 of the fuel nozzles 26, A seal 102, such as a rope seal, can be used around the neck 100, within the outer spacing 42, to impede infiltration of outer air from the combustion chamber outer casing 23 if desired. The design can be different in particular if the fuel nozzles 26 are designed to be assembled after having assembled the heat shield members 52, 54 to the fuel manifold 22. Fuel inlet(s) can be connected to the fuel manifold ring in a manner similar to fuel nozzles 26, for instance.

As alluded to above, pressure considerations should be addressed to ensure that the heat shield assembly 32 can withstand the variations in operating pressures in the combustor outer casing 23 and avoid collapsing onto the fuel manifold ring 22. Therefore, the presence of air leakage passages along the heat shield can be somewhat useful because it can allow equilibration of internal pressure. On the other hand, it is desirable that the flow of air across the heat shield be limited as much as possible to low velocity flows of a safe minimum to the end of equilibration of pressure (i.e. dead air) and that the construction of the heat shield 32 prevent as much as possible the imparting of higher speed internal flows such as could potentially be imparted by the swirl in the outer air stemming form compressor rotation. To this end, it can be useful to use a seal along the joints between the two heat shield members 52, 54 and around the necks of fuel nozzles and/or fuel inlet(s), as disclosed in the embodiment depicted. If the assembly is considered too airtight from a pressure equalization standpoint, purge holes can be provided through one or both shield members 52, 54 for instance.

In this particular embodiment, referring back to FIG. 3, it is shown that rope seals 84, 85 are used as the seals at the joints between the heat shield members 52, 54. More particularly, the sheet components of the two heat shield members 52, 54 which come into engaging contact with each other were designed here with a double step configuration 82, with the intermediate step 108, 110 of each one coming into contact with each other in the middle. Further, the first shield member flanges 74, 76 each have a groove 112, 114 defined therein just before the intermediate step 108, including a radially-outer groove 112 and a radially-inner groove 114. These grooves 112, 114 are sized to receive corresponding rope seals 84, 85 therein. On the other hand, the second heat shield member 54 has the folds or bends 116 leading to its intermediate step 110 provided at a location corresponding to the rope seal 84 in a manner that once in the engagement, the inner surface of second heat shield member 54 maintains the rope seals 84, 85 trapped inside the corresponding grooves 112, 114. The rope seals can be continuous, or can alternately be discontinuous and interrupt to allow for the presence of fuel nozzles and/or fuel inlets, for instance.

The above description is meant to be exemplary only, and one skilled in the art will recognize that changes may be made to the embodiments described without departing from the scope of the invention disclosed. For example, the heat shield assembly can include a number of arc-shaped portions rather than a continuous ring assembly, and the shape of heat shield assembly can be adapted to the cross-sectional shape of the internal manifold ring which can be more circular or elliptical for instance. Still other modifications which fall within the scope of the present invention will be apparent to those skilled in the art, in light of a review of this disclosure, and such modifications are intended to fall within the scope of the appended claims.

The invention claimed is:

1. A fuel manifold assembly for a gas turbine engine comprising:
    an annular manifold body defined around an axis, with at least one fuel inlet, a plurality of fuel nozzle outlets, and at least one internal fuel passages connecting the at least one inlet to the plurality of fuel nozzle outlets;
    an annular heat shield assembly mounted to and surrounding the manifold body, the heat shield assembly having an inner surface facing the manifold body and being spaced apart therefrom by an inner air gap defined therebetween, the inner air gap substantially surrounding the manifold body, and the heat shield assembly having an outer surface facing away from the manifold body and spaced apart from the inner surface by an outer air gap substantially surrounding the inner air gap, at least the outer air gap being formed by a double wall configuration of the heat shield assembly.

2. The fuel manifold assembly of claim 1, wherein the heat shield assembly includes a front half having an axially-oriented U-shape cross-section, and a rear half having an axially-oriented U-shape cross section and being matingly shaped to snugly engage the front half with the annular manifold body therebetween.

3. The fuel manifold assembly of claim 2, wherein both the front half and the rear half have said double wall configuration formed by an outer sheet metal member secured to an internal sheet metal member with at least a portion of the outer air gap spacing therebetween.

4. The fuel manifold assembly of claim 2, wherein in a first one of the front half and the rear half, the inner sheet metal member has straight ends and the outer sheet metal member has bent ends secured to the inner sheet metal member, and in the other one of the front half and the rear half, the outer sheet metal member has straight ends and the inner sheet metal member has bent ends secured to the outer sheet metal member; wherein the bent ends of at least one of the front half and the rear half are formed with an annular groove receiving a rope seal trapped therein.

5. The fuel manifold assembly of claim 1, wherein the heat shield assembly has a plurality of nozzle apertures, and further comprising a plurality of nozzles having a neck extending through corresponding ones of the nozzle apertures and into corresponding ones of the nozzle outlets.

6. The fuel manifold assembly of claim 1, wherein the annular heat shield assembly has at least one inlet aperture corresponding to the at least one inlet, and at least one corresponding inlet conduit extending through the at least one inlet aperture.

7. The fuel manifold assembly of claim 1, further comprising at least one pressure equalization hole extending across the annular heat shield assembly for pressure equalization between the internal air gap, the outer air gap, and the region around the fuel manifold assembly.

8. The fuel manifold assembly of claim 1, further comprising at least three circumferentially interspaced fastener arrangements mounting the annular heat shield assembly to the annular manifold body, said fastener arrangements comprising a bolt having a head received on an outer surface of the annular heat shield assembly, a shaft extending across the annular heat shield assembly and through a bore defined in the manifold body with a tip protruding from the annular heat shield assembly and fastened opposite the head, the bore being wider than the shaft and an air space being formed therebetween, and two bushings snugly receiving corresponding portions of the shaft and snugly received in the bore on opposite sides of the manifold body.

9. The fuel manifold assembly of claim 1, wherein at least one of an outer-facing surface of the annular heat shield assembly and an outer-facing surface of the annular manifold body is coated with a reflective coating.

10. A heat shield assembly for a gas turbine engine fuel manifold having an annular body around an axis, with at least one fuel conduit formed therein and extending along an arc-shaped path in the annular body between a fuel inlet and at least one fuel outlet, the heat shield assembly comprising:
a front shield member having a recess shaped to axially receive at least a portion of the annular body of the fuel manifold therein, a double wall portion with a dead air gap therein, and two free edges forming an opening to the recess; and
a rear shield member having a recess shaped to axially receive at least a portion of the annular body of the fuel manifold therein, a double wall portion with a dead air gap therein, and two free edges forming an opening to the recess, the rear shield member being snugly engaged with the front shield member for the recesses to unite with the annular body therein and an inner air gap being formed between the annular body and an internal face of the engaged shield members and an outer air gap including the dead air gaps being formed between the internal face of the engaged shield members and an external face of the engaged shield members;
wherein the combined inner air gap and outer air gap form a thermal insulation system for the fuel conduit.

11. The heat shield assembly of claim 10, wherein the front shield member and the rear shield member each include an inner sheet metal pressing and an outer sheet metal pressing and forming corresponding walls of the double wall portion.

12. The heat shield assembly of claim 11, wherein in a first one of the front shield member and the rear shield member, the inner sheet metal pressing has straight ends leading to the free edges and the outer sheet metal member has inwardly bent ends secured to the inner sheet metal pressing, and in the second one of the front shield member and the rear shield member, the outer sheet metal pressing has straight ends leading to the free edges and the inner sheet metal pressing has bent ends secured to the outer sheet metal member.

13. The heat shield assembly of claim 12, wherein the free edges of the inner sheet metal pressing of the first shield member abut against the inner surface of the second shield member upon said engagement, past the bent ends, and the outer air gap further includes a spacing between overlapping portions of the engaged shield members.

14. The heat shield assembly of claim 12, wherein the bent ends of at least one of the front shield member and the rear shield member are formed with an annular rope-seal-receiving groove and the bent ends of the other one of the front shield member and the rear shield member are formed to maintain the rope seal trapped within the corresponding grooves upon said engagement.

15. The fuel manifold assembly of claim 10, further comprising an outer seal between the front half and the rear half, positioned axially-outward relative the manifold body and an inner seal between the front shield member and the rear shield member, positioned axially-inward relative the manifold body, upon said engagement.

16. The fuel manifold assembly of claim 10, wherein the heat shield assembly has a plurality of nozzle apertures each formed through a corresponding portion of both the front shield member and the rear shield member.

17. The fuel manifold assembly of claim 10, wherein the heat shield assembly has at least one inlet aperture formed through a corresponding portion of both the front shield member and the rear shield member.

18. The fuel manifold assembly of claim 10, further comprising at least one pressure equalization hole extending across the double wall portions of both the front shield member and the rear shield member.

19. The fuel manifold assembly of claim 10, wherein both the front shield member and the rear shield member are annular and span around the entire annular body upon said engagement.

* * * * *